US007717062B2

(12) United States Patent
Kline

(10) Patent No.: US 7,717,062 B2
(45) Date of Patent: May 18, 2010

(54) PET SEAT ARRANGEMENT

(76) Inventor: Nancy Kline, 917 Emerald St., Redondo Beach, CA (US) 90277

( * ) Notice: Subject to any disclaimer, the term of this patent is extended or adjusted under 35 U.S.C. 154(b) by 438 days.

(21) Appl. No.: 11/480,720

(22) Filed: Jul. 5, 2006

(65) Prior Publication Data
US 2008/0245311 A1 Oct. 9, 2008

Related U.S. Application Data

(63) Continuation-in-part of application No. 11/154,302, filed on Jun. 16, 2005, now abandoned.

(51) Int. Cl.
A01K 1/035 (2006.01)
(52) U.S. Cl. ...................... 119/28.5; 119/771
(58) Field of Classification Search .............. 119/28.5, 119/498, 482, 771, 496, 497; 297/464, 468, 297/473, 485; 5/81.1, 627, 628, 93.2, 94, 5/98.3; D30/118
See application file for complete search history.

(56) References Cited

U.S. PATENT DOCUMENTS

| 972,732 | A | * | 10/1910 | Temple | 5/94 |
| 2,169,030 | A | * | 8/1939 | Robrahn | 217/42 |
| 3,426,368 | A | | 2/1969 | McCluskey | |
| 3,833,947 | A | * | 9/1974 | Sorensen | 5/94 |
| 4,257,349 | A | * | 3/1981 | Carlin | 119/28.5 |
| 4,539,935 | A | * | 9/1985 | Meyer | 119/28.5 |
| 4,889,388 | A | * | 12/1989 | Hime | 297/464 |
| 5,005,526 | A | * | 4/1991 | Parker | 119/751 |
| 5,133,294 | A | | 7/1992 | Reid | 119/771 |
| 5,275,464 | A | | 1/1994 | Eichhorn et al. | 297/488 |
| 5,277,148 | A | | 1/1994 | Rossignol | 119/19 |
| 5,474,329 | A | | 12/1995 | Wade et al. | 280/749 |
| 5,479,892 | A | * | 1/1996 | Edwards | 119/771 |
| 5,551,373 | A | | 9/1996 | O'Donnell | 119/28.5 |
| 5,572,953 | A | * | 11/1996 | Phelan et al. | 119/496 |
| 5,615,640 | A | * | 4/1997 | Luiz | 119/482 |
| 5,685,258 | A | | 11/1997 | Fricano | 119/28.5 |
| 5,718,191 | A | | 2/1998 | O'Donnell | 119/771 |
| D392,775 | S | | 3/1998 | McMahon | D30/118 |
| D396,332 | S | | 7/1998 | McMahon | D30/118 |
| 5,785,003 | A | | 7/1998 | Jacobson | |
| D400,313 | S | | 10/1998 | Chatwell | D30/118 |
| 5,832,874 | A | | 11/1998 | Ravin | |
| 6,024,046 | A | | 2/2000 | Geiger et al. | 119/28.5 |
| 6,058,529 | A | * | 5/2000 | Goysich | 5/94 |
| 6,079,370 | A | * | 6/2000 | Al-Birmani et al. | 119/771 |
| D427,731 | S | | 7/2000 | Copple | D30/118 |
| D435,704 | S | | 12/2000 | Friberg | D30/118 |
| 6,237,999 | B1 | | 5/2001 | Hobson | 297/256.15 |
| 6,374,771 | B1 | | 4/2002 | Zwickle | 119/28.5 |
| D461,966 | S | | 8/2002 | Reece | D6/356 |
| 6,588,365 | B2 | | 7/2003 | Best Wright | 119/28.5 |

(Continued)

OTHER PUBLICATIONS

Klein, Nancy, "Merchandise Data Sheet." transmitted to Potpourri Group, Inc. Jul. 1, 2005.

(Continued)

Primary Examiner—Yvonne R. Abbott
(74) Attorney, Agent, or Firm—Kilpatrick Stockton LLP

(57) ABSTRACT

A pet seat for comparatively small pets which pet seat may be detachably mounted on the console structure of a vehicle.

31 Claims, 10 Drawing Sheets

U.S. PATENT DOCUMENTS

| | | | |
|---|---|---|---|
| 6,591,787 B1 | 7/2003 | Gantz et al. | 119/771 |
| 7,204,205 B2 * | 4/2007 | O'Donnell | 119/771 |
| 7,383,789 B2 * | 6/2008 | Wilkes | 119/771 |
| 7,448,345 B1 | 11/2008 | O'Donnell | |
| 2005/0284415 A1 | 12/2005 | O'Donnell | |

OTHER PUBLICATIONS

U.S. Appl. No. 11/154,302, Office Action mailed Jul. 10, 2007.

U.S. Appl. No. 11/154,302, Response mailed Oct. 15, 2007 and received May 12, 2008.

U.S. Appl. No. 11/154,302, Notice of Allowance mailed Jul. 10, 2007.

U.S. Appl. No. 11/154,302, Amendment mailed Jul. 30, 2009.

U.S. Appl. No. 11/154,302, Response to Amendment mailed Mar. 9, 2009.

* cited by examiner

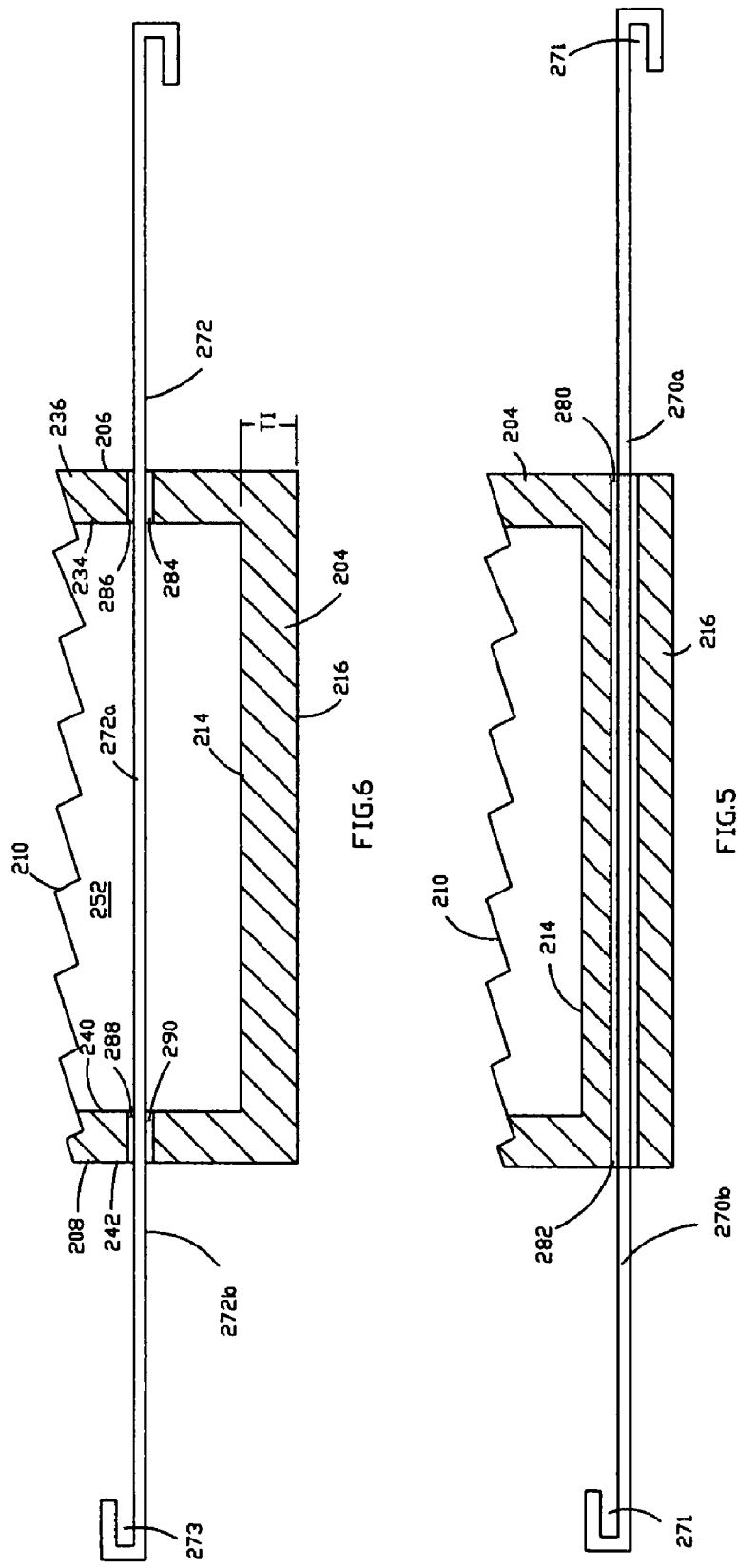

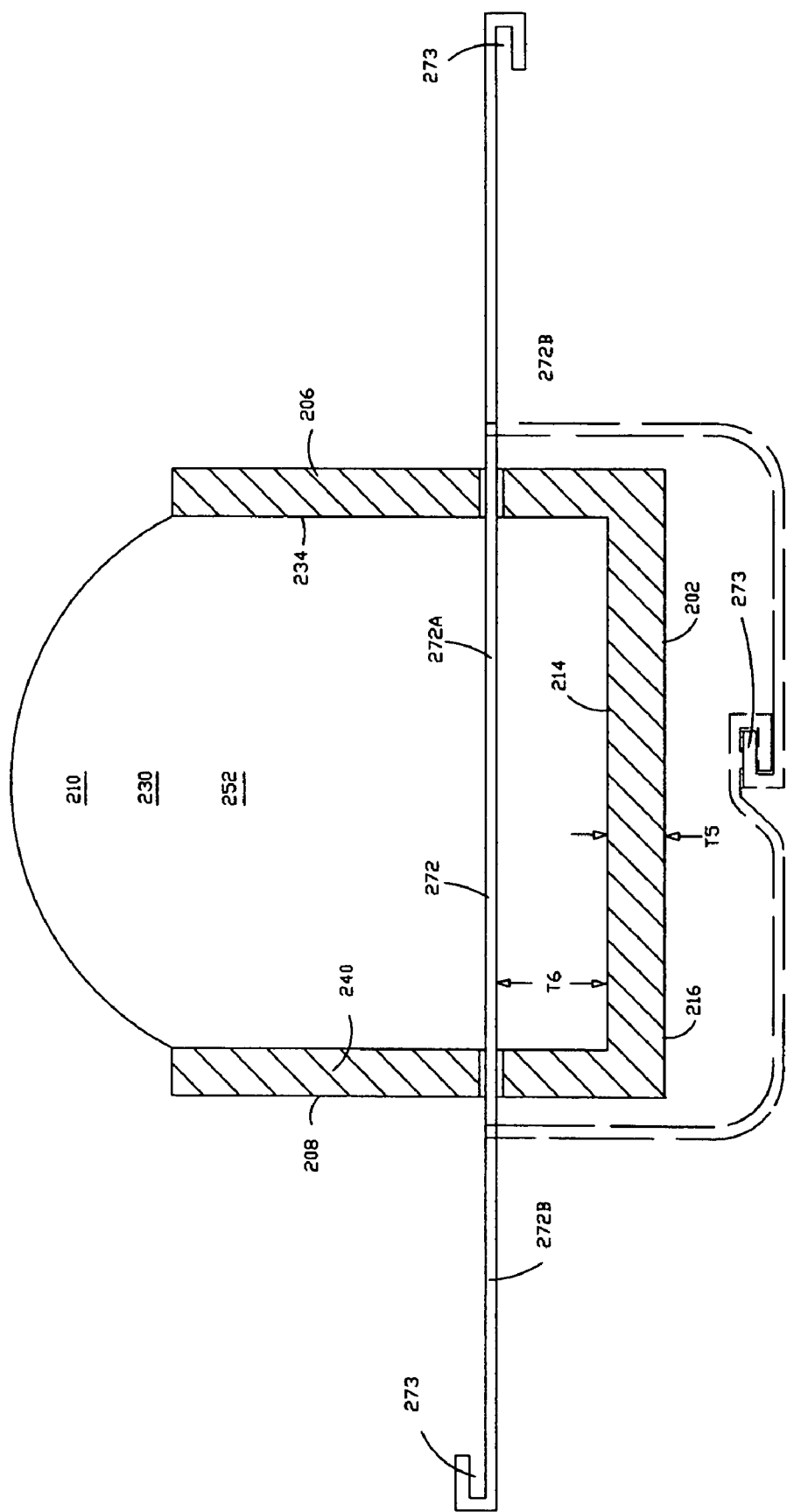

PET SEAT ARRANGEMENT

REFERENCE TO RELATED APPLICATIONS

This application is a continuation in part of my invention in my co-pending patent application Ser. No. 11/154,302, filed Jun. 16, 2005 now abandoned entitled: "PET SEAT ARRANGEMENT" and the teaching and technology thereof is incorporated herein.

BACKGROUND OF THE INVENTION

1. Field of the Invention

This invention relates to seats for pets and more specifically to an improved pet seat or bed for holding a small pet in a secure position in a vehicle on the console thereof and which may also be utilized as a pet bed in locations other than a vehicle and also may be utilized for carrying a pet.

2. Description of the Prior Art

Many seats for pets which may be utilized in vehicles for transporting the pets have heretofore been described and/or offered for sale. Many such devices were the same as or similar to booster seats for children. Some of the prior art pet seats were specifically designed for pets rather than children and which recognized the needs of the pet rather than the child. In many of the prior art pet seats for vehicles the seat itself was not attached to the seat or back of the vehicle seat in a secure fashion or else required modification to the vehicle seat/back for securing the pet seat. Such modifications were often expensive and difficult to install in a vehicle. Still other vehicle pet seats did not provide for or allow the pet, when positioned in the seat, to have the visibility of the surroundings that many pets, such as dogs, desire when in a vehicle. Still other prior art pet seats have had mechanical or rigid structures incorporated therein which increases the cost and complexity of such pet seats. Further, some prior art pet seats did not provide for adequately and safely securing the pet into the seat as well as securing the seat in the vehicle.

It is desirable to have the pet seat incorporate structure for securing the pet in the pet seat by utilizing an attachment to the conventional collar/harness of the pet. In some of the prior art pet seats the vehicle seat belt structure was utilized to restrain the pet seat but at least some portions of the vehicle seat belt structure were in regions accessible to the pet. In such prior art pet seats, the pet could chew on the securing vehicle seat belt structure thereby weakening the seat belt and thus impairing its safety function.

In the case of any motion of the vehicle inducing rapid changes in acceleration such as sudden stops, accidents and the like, it is desired that the pet seat provide a cushioning effect in the sides, front, back as well as a cushioned seat upon which the pet may sit and or lie down.

Since many pets desire to look in the direction of travel, it is desirable to have the pet seat designed so that the forward vision of the pet while in the pet seat is minimally obscured and yet the forward portion of the pet seat still providing cushioning for the pet.

Console structures are often provided in vehicles, for example, between the driver and passenger seat in the front seat of the vehicle and often between the seats in the second and/or third row of seats in a vehicle such as sport utility vehicles, vans, cabin pickup trucks and the like. Many of the consoles heretofore utilized in the vehicles are of the "clam shell" type structure in which a lid to the console is hinged to the rear of the body of the console and open from the front thereof.

The structure of the pet seat should be complimentary to and inter-engaging with the design of some secure structures in vehicles. The consoles of the vehicles can provide such secure structure for the attachment of a pet seat thereto.

In some of the prior art pet seats, complicated, and costly rigid mechanical arrangements or other rigid structures have been incorporated into the seat design. Such rigid structures could injure the pet and/or add cost to the manufacture of the pet seat. It is desirable that the pet seat be free of the rigid mechanical structures or components so that the cost of the pet seat and safety of the pet are provided. Further, the complicated structural attachments often utilized for securing the prior art pet seats to the vehicle structures often deterred consumers from the use of the pet seat or resulted in the pet seat not being securely attached with the resultant danger of injury to the pet.

Thus, it has long been desired to provide a pet seat, particularly adapted to accommodate small pets and which pet seat may be securely attached to the console of a vehicle with a minimum of complicated attachment methods.

The prior art pet seats have not been able to provide these desiderata.

SUMMARY OF THE INVENTION

Accordingly, it is an object of the present invention to provide an improved pet seat particularly useful for transporting small pets in a vehicle.

It is another object of the present invention to provide a pet seat for small pets and which the pet seat has cushioning in the front, back, sides and seat, but still allows an improved forward vision for the pet in the pet seat.

It is another object of the present invention to provide an improved pet seat that may be restrained in a vehicle by secure attachment to the console in the vehicle.

It is yet another object of the present invention to provide an improved pet seat for vehicles in which there is incorporated structure in the pet seat for attachment to the pet's collar or harness to restrain the pet in the pet seat.

It is another object of the present invention to provide a safe and secure pet seat for holding the pet therein.

The above, and other objects of the present invention may be achieved, according to a preferred embodiment thereof by providing a body having a seat member, a pair of spaced apart opposed side members, a back member and a front member. The pair of spaced apart opposed side members, the back member and the front member are upstanding from the seat member and the seat member, side members, back member and front member define a pet accepting cavity therebetween. The body is fabricated from a flexible, resiliently deformable material such as an open cell or closed cell polyurethane foam plastic. The characteristics of the body m, such as density, indentation force deflection, or IDF, color, ball rebound and the like may be selected as desired for particular applications.

A flexible cover is removably mounted on the body to cover the seat member, the first and second side members, the front member and the back member. The softness, resiliency, if any, and degree of flexibility of the cover may be selected as desired for particular applications. The cover is removable from the body member for cleaning. A zipper, hook and loop, elastic or the like may be utilized to allow the removal of the cover from the body.

In preferred embodiments of the present invention the seat member, back member, front member and both side members are unitarily molded from the plastic foam. In other embodiments of the present invention, one or more of the seat member, the back member, the first side member, the second side member and the front member may be separately molded or fabricated from the plastic foam and secured by, for example, adhesive to the adjacent members. Similarly, for example, the seat member may be separately fabricated from a sheet of the foam plastic and the front member, the first side member, second side member and back member may be unitarily molded from the foam plastic and secured to the seat member to define the body. Any combination of unitarily fabricated or molded parts forming the components of the body may be secured together by any desired means to form the body.

The seat member has an upper surface and a lower surface and the lower surface thereof defines a bottom face surface. The back member has an inner surface and an outer surface and the outer surface defines a rear face surface. Each of the side members have an inner surface and outer surface and the outer surface of each side member defines a side face surface. The front member has an inner surface and an outer surface and the outer surface defines a front face surface. The inner surfaces of the seat member, the back member, the side members and the front member define a pet receiving cavity therebetween.

In the preferred embodiment of the present invention, the front member of the body has a top portion that is arcuate in shape and curved downwardly towards the seat member so as to provide a forward view for the pet. The back member has a top portion extending away from the seat member and above the tops of the side members to provide additional cushioning for the pet.

The seat member has first walls defining a strap accepting channel therein and extending therethrough intermediate the upper surface and lower surface of the seat member. The strap accepting channel is in regions adjacent the front member. A first strap member is positioned in the strap accepting channel and the first strap member has a first portion in the strap accepting channel and a second portion in regions adjacent the bottom face of the seat member. In the preferred embodiments of the present invention the first strap member is detachably mounted on the body and may, for example have ends thereof provided with a buckle, clasp or other detachable connection structure.

The first side member has second walls defining first strap accepting aperture therethrough and the first strap accepting aperture is in regions adjacent the upper surface of the seat member and the inner surface of the back member. The second side member has second walls defining second strap accepting aperture therethrough and the second strap accepting aperture is in regions adjacent the upper surface of the seat member and the inner surface of the back member and is aligned with the first strap accepting aperture. A second strap member extends through the first and the second strap accepting apertures and has a first portion in the pet accepting cavity and a second portion in regions adjacent the bottom face of the seat member. In the preferred embodiments of the present invention the second strap member is detachably mounted on the body and may, for example have ends thereof provided with a buckle, clasp or other detachable connection structure.

In some applications of the preferred embodiments of the present invention the upper surface of the seat member and the inner surfaces of the back member, the front member and each of the side members are planar. In other applications of the preferred embodiments of the present invention one or more of the upper surface of the seat member and the inner surfaces of the back member, the front member and each of the side members may be concave in order to provide a resting place for the pet in the pet receiving cavity.

BRIEF DESCRIPTION OF THE DRAWING

The above and other objects of the present invention my be more fully understood from the following detailed description taken together with the accompanying drawing wherein similar reference characters refer to similar elements throughout and in which:

FIG. 5 is a partial sectional view of the embodiment of FIG. 4 taken along the line 5-5 of FIG. 4;

FIG. 6 is a partial sectional view of the embodiment of FIG. 4 taken along the line 6-6 of FIG. 4;

FIG. 7 is a sectional view of the embodiment of FIG. 4 taken along the line 7-7 of FIG. 4;

DESCRIPTION OF THE PREFERRED EMBODIMENTS

Figure 1:
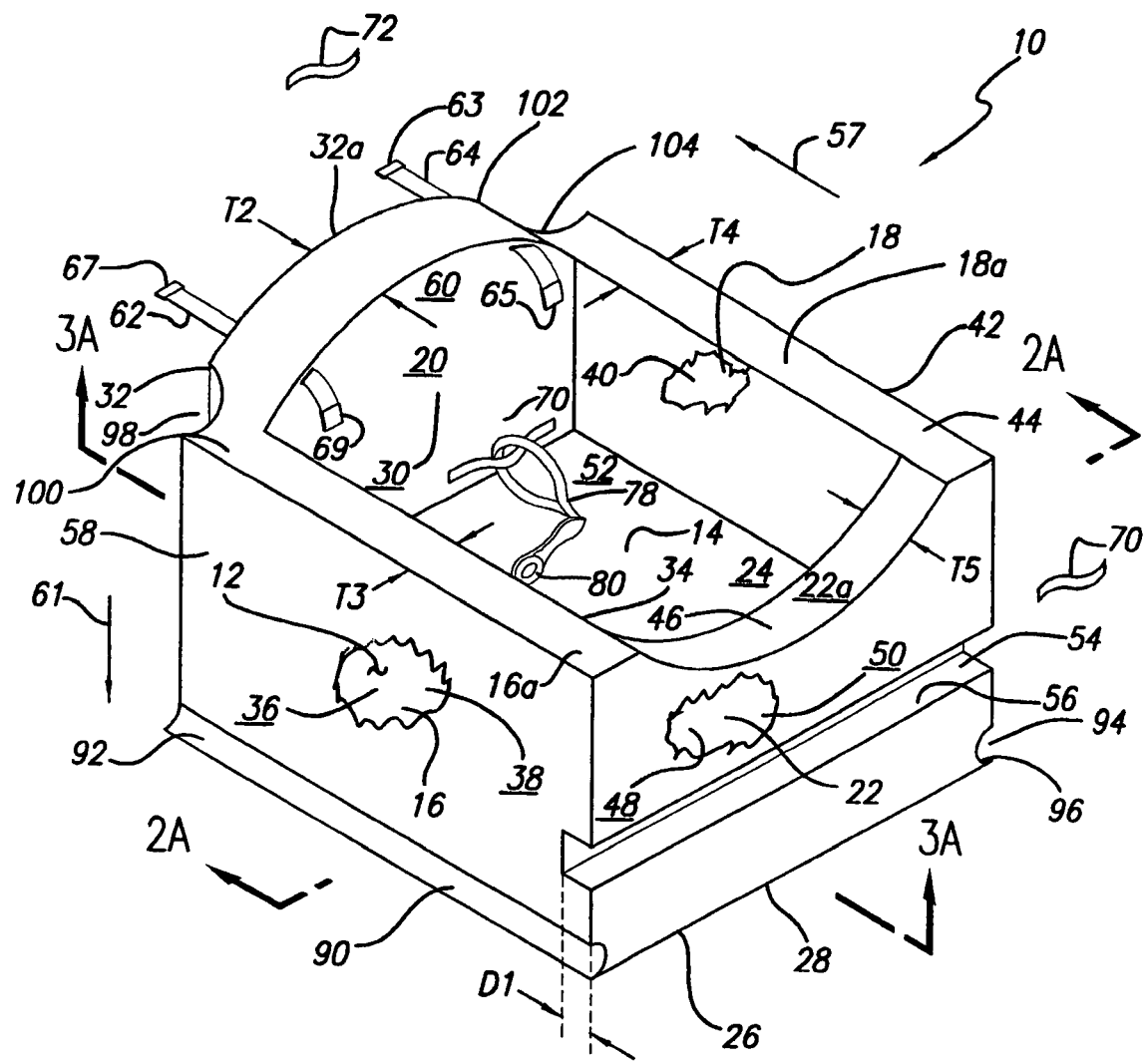
FIG. 1 is a perspective view of a preferred embodiment of the invention set forth in my above mentioned co-pending patent application Ser. No. 11/154,302.

Referring now to the drawing, there is shown in FIG. 1, FIGS. 2A and 2B and FIGS. 3A and 3B embodiments of the pet seat of the invention set forth in my above mentioned co-pending patent application Ser. No. 11/154,302 and in FIG. 1 the embodiment shown thereon is generally designated 10. The embodiment 10 has a body member 12 preferably fabricated from a flexible, resiliently deformable material such as a closed cell polyester and/or polyether based urethane polymer foam plastic, though depending upon the application, an open cell foam may be utilized for the body member 12. Similarly, foam materials other than polyester and/or polyether based urethane polymer may utilized for the body member 12 and materials other than a foamed plastic, such as, for example, conventional upholstery stuffing or the like may be utilized for the body 12 depending on the particular application.

In the above mentioned embodiment 10, the polyurethane foam plastic may have density in the range of 0.5 to 15.0 pounds per cubic foot, a ball rebound in the range of 20% to 30% and a 25% IFD in the range of 60 to 70 although densities less than 0.5 or greater than 1.5 pounds per cubic foot and a ball rebound of less than 20% or greater than 30% and a 25% IFD less than 60 or greater than 70 may be selected depending upon the particular application of the pet seat.

The body 12 is comprised of a seat member 14, a first side member 16, a second side member 18, a back member 20 and a front member 22. The seat member 14 has an upper surface 24, a lower surface 26 with a first preselected thickness T1 (FIG. 2A) therebetween. The lower surface 26 of the seat member 14 of the body 12 defines a bottom face surface 28. The back member 20 has an inner surface 30, an outer surface 32 and a second preselected thickness T2 therebetween. The outer surface 32 of the back member 20 of body 12 defines a rear face surface and the back member 20 is upstanding from the seat member 14. In the embodiment 10, the back member 20 is at substantially a right angle to the seat member 14, though angles other than a right angle may be utilized in particular desired applications.

The first side member 16 has an inner surface 34 and an outer surface 36 with a third preselected thickness T3 therebetween. The outer surface 36 of first side member 16 defines a first side face surface 38 and the first side ember 16 of body 12 is upstanding from the seat member 14 at substantially a right angle, though angles other than a right angle may be utilized in particular desired applications.

The second side member 18 is spaced from the first side member 16 and has an inner surface 40 and an outer surface 42 with a fourth preselected thickness T4 therebetween. The outer surface 40 of second side member 18 defines a second side face surface 44 and the second side member 18 of body 12 is upstanding from the seat member 14 at substantially a right angle, though angles other than a right angle may be utilized in particular desired applications.

The front member 22 is spaced from the back member 20 and has an inner surface 46 and an outer surface 48 with a fifth preselected thickness T5 therebetween and the front member 20 is upstanding from the seat member 14 at substantially a right angle. The outer surface 48 of front member 22 defines a front face surface 50. The inner surface 30 of back member 20, the inner surface 34 of first side member 16, the inner surface 40 of second side member 18, the inner surface of front member 22 and the upper surface 24 of seat member 14 define a pet accepting cavity 52 therebetween.

In preferred embodiments of the present invention the seat member 14, first side member 16, second side member 18, back member 20 and front member 22 are unitarily fabricated, for example by molding. In other preferred embodiments, one or more of the seat member 14, first side member 16, second side member 18, back member 20 and front member 22 may be separately fabricated for example by cutting from a sheet of appropriate material from the remainder of the members and all the members joined together as may be required by an adhesive bonding, though other bonding methods as know in the art may be utilized. For example, the first side member 16 and/or the second side member 18 may be separately fabricated for example by cutting from a sheet of appropriate material and the seat member 14, back member 20 and front member 22 may be unitarily fabricated for example by molding and the first side member 16 and/or second side member 18 joined thereto by adhesive bonding. In another preferred embodiment of the present invention the seat member 14 may be separately fabricated for example by cutting from a sheet of appropriate material and the first side member 16, second side member 18, front member 22 and back member 20 may be unitarily fabricated for example by molding and then joined to the seat member 14 by adhesive bonding. Other arraignments of unitarily molded parts and separately molded or cut parts may be utilized as desired for particular applications.

If desired, the materials utilized for the various parts of the body 12 may be varied as may the characteristics thereof. For example the seat member 14 may be fabricated from a less dense foam plastic than the side member 16 and 18 and/or the back member 20 and/or the front member 22.

In the preferred embodiments of the invention set forth in my above mentioned co-pending patent application Ser. No. 11/154,302, the first preselected thickness of thickness T1 of the seat member 24 is greater than the second preselected thickness T2 of back member 20, third preselected thickness T3 of first side member 16, fourth preselected thickness T4 of second side member 18 and fifth preselected thickness T5 of front member 22. If desired, the second preselected thickness T2 of back member 20 may be greater than the third preselected thickness T3 of first side member 16 and fourth preselected thickness T4 of second side member 18. In these embodiments of the invention set forth in my above mentioned co-pending patent application Ser. No. 11/154,302, the third preselected thickness T3 of first side member 16 and fourth preselected thickness T4 of second side member 18 may be the same. Variations in the thickness selected for each member of body 12 may be chosen as may be desired for particular applications.

The front face surface 50 has first walls 54 defining a restraining strap accepting groove 56 therein which is spaced from the bottom face surface 28. The restraining strap accepting groove 56 extends towards the back member 20 a distance D1 and extends across the front face surface 50 from the first side face surface 38 to the second side face surface 44. The groove 56 accepts a part of a conventional vehicle seat belt for restraining the embodiment 10 in a vehicle seat against the seat back by exerting a rearwardly directed force indicated by the arrow 57. Since the groove 56 is spaced from and not accessible to a pet in the pet accepting cavity 52 damage to the seat belt contained in the groove by, for example, the pet chewing thereon, is avoided and the integrity of the seat belt of the vehicle is maintained. This is a desirable feature of the invention set forth in my above mentioned co-pending patent application Ser. No. 11/154,302 since pets, such as dogs, often chew on straps which may destroy the integrity of the seat belt.

The back member 20 has an upper portion 60 spaced above the first side member 16 and second side member 18.

A flexible cover 58 is provided in the embodiment 10 for removably covering the body 12. One or more zippers, (not shown) may be utilized for removably securing the cover as may one or more hook and loop seams or the like. The cover 58 may be fabricated from cotton, nylon, velvet, canvass or any desired material suitable for the purpose. Preferably the cover is tight fitting over the body member 12. If the cover 58 becomes soiled, it may be removed from the body 12 for appropriate cleaning. In the event a liquid seeps through the cover 58 onto the body member 12, it is preferred, as noted above, that the body member 12 be a closed cell foam plastic so that such liquid may be conveniently removed.

The back member 20 has an upper portion 60 which, in preferred embodiments of the of the invention set forth in my above mentioned co-pending patent application Ser. No. 11/154,302, is spaced above the top 16a of first side member 16 and top 18a of second side member 18.

A first strap member 62 is coupled to the cover 58 at the upper portion 60 in regions adjacent the intersection of the back member 20 with the first side member 16 and has a releasable connection 67 and 69 for joining together to from a strap accepting loop into which the shoulder harness portion of the vehicle seat belt may be placed so as to exert a downwardly directed force indicated by the arrow 61 for urging the embodiment 10 towards the vehicle seat. When the embodiment 10 is placed in the left hand vehicle seat, the lap belt portion of the vehicle seat belt indicated by the fragmentary showing at 70 is inserted in the restraining strap accepting groove 56 and the shoulder harness portion of the vehicle seat belt indicated by the fragmentary showing at 72 is restrained by the strap 62 at the top portion 60 of the back member 20. Such an arrangement prevents the vehicle seat belt being in a position where the pet in the cavity 52 may cause damage thereto.

For the embodiment 10 placed in the right hand vehicle seat, a similar arrangement of the vehicle seat belt for restraining the pet seat may be utilized with the shoulder harness portion preferably the vehicle seat belt restrained by second strap 64 connected together by end couplings 63 and 65 as described above for the first strap 62.

The first strap 62 and second strap 64 are preferably secured to the cover 58 so as to be removable therewith when the cover 58 is removed for cleaning.

In the embodiment 10 of the invention set forth in my above mentioned co-pending patent application Ser. No. 11/154,302 it is desired to provide a pet restraining arrangement for restraining a pet in the cavity 50. To accomplish this criteria there is provided a third strap 76 which extends through the back member 20 in regions spaced from the seat member 14 and preferably intermediate the first side member 16 and second side member 18. The third strap member 76 is removably connected together by connecting means such a hook and loop as indicated at 77 or other fastener types to allow the cover 58 to be removed from the body 12. A pet connecting strap 78 is provided that is removable connected by, for example hook and loop type fasteners or other desired type fasteners and connected through the third strap 76. The pet connecting strap is provided with a snap type fastener indicated at 80 for connection to the collar of a pet in the cavity 52.

Since many seats and seat backs of vehicles are provided with raised portions at the edges thereof, in the embodiments of the invention set forth in my above mentioned co-pending patent application Ser. No. 11/154,302 grooves are provided for accepting such raised portions in order that the embodiment 10 may be more securely held in place without affecting the retention on the vehicle seat and seat back. The first side face surface 36 has second walls 90 defining a first longitudinal groove 92 at said lower surface 26 of said seat member 14. The first longitudinal groove 92 extends from the front face surface 50 to the rear face surface 32. Third walls 94 on second side face surface 44 define a second longitudinal groove at the lower surface 26 of said seat member 14. The second longitudinal groove 96 extends from the front face surface 50 to the rear face surface 32 and is substantially parallel to the first longitudinal groove 92. The first and second longitudinal grooves can accept the raised portions that are on the edges of the seat of a vehicle should such be present. The flat portion 28a of the lower face surface 28 allows the embodiment 10 to rest securely on the seat of a vehicle whether or not there are any raised portions on the seat of the vehicle.

The first side face surface 38 has fourth walls 98 defining a first upstanding groove 100 adjacent the rear face surface 32 and the first upstanding groove 100 extends from the lower face surface 28 to the top portion 60 of the back member 20. The second side face surface 44 has fifth walls 102 defining a second upstanding groove 104 adjacent the rear face surface 32 and the second upstanding groove extends from the lower face surface 28 to the top portion 60 of the back member 20. The first upstanding groove 100 and second upstanding groove are substantially parallel and can accept the raised portions at the edges of a vehicle seat back should such be present. The flat portion 32a of back face surface 32 between the first upstanding groove 100 and the second upstanding groove 104 allows the pet seat embodiment 120 to rest securely against the vehicle seat back whether or not there are any raised portions thereof.

For clarity, the cover 58 is omitted from the showing in FIGS. 2A, 2B, 3A and 3B.

Figure 2A:
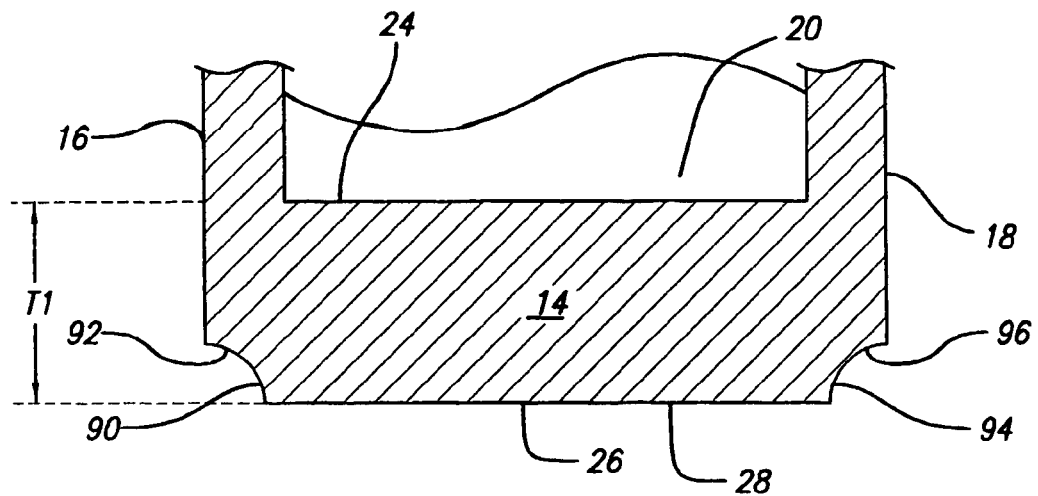
FIG. 2A is a partial sectional view along the line 2A-2A of FIG. 1.

FIG. 2A is a partial sectional view along the line 2A-2A of FIG. 1 and illustrates the embodiment 10 on which the seat member 14, first side member 16, second side member 18, back member 20 and front member 22 are unitarily fabricated by, for example molding.

Figure 2B:
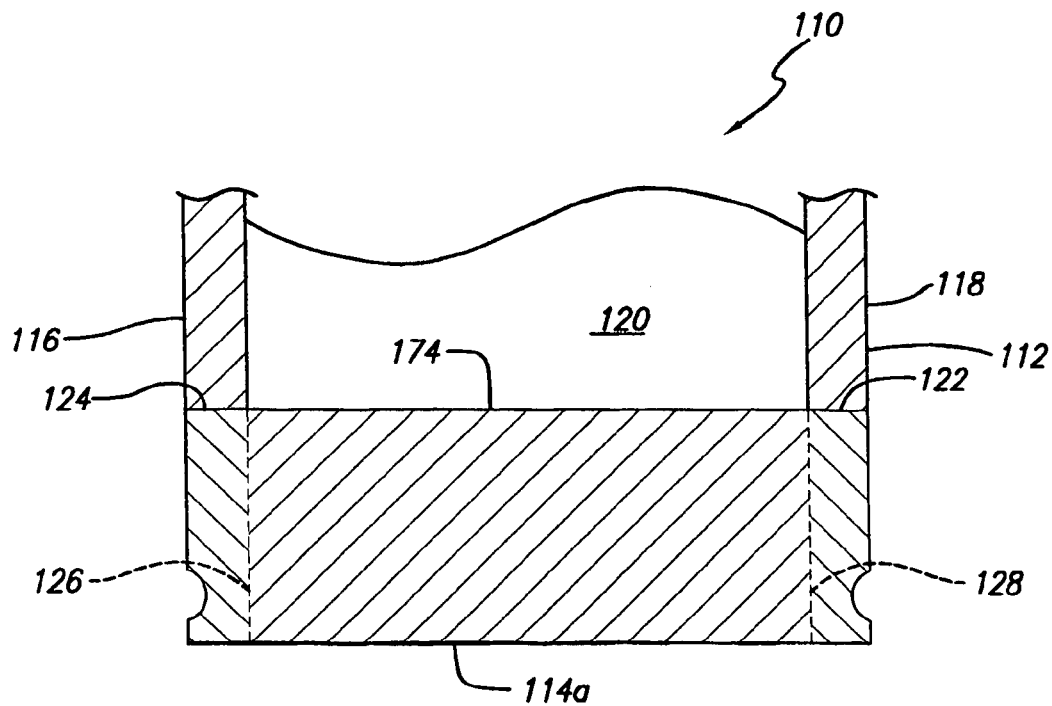
FIG. 2B is a partial sectional view similar to FIG. 2A of another embodiment of the invention set forth in my above mentioned co-pending patent application Ser. No. 11/154,302.

FIG. 2B is a partial sectional view similar to FIG. 2A os another embodiment 110 of a pet seat 112 having a seat member 114 which is generally similar to the seat member 14 described above and in which a first side member 116 and second side member 118 are unitarily fabricated from, for example, a sheet of foam plastic and adhesively or otherwise secured to the seat member 112. as indicated at 122 and 124. Alternatively, the first side member 116 may extend as shown by the dotted line 126 to the bottom surface 114a of seat member 114 and bonded thereto there along. Similarly, the second side member 116 may extend as shown by the dotted line 128 to the bottom surface 114a of seat member 114 and bonded thereto there along.

Figure 3A:
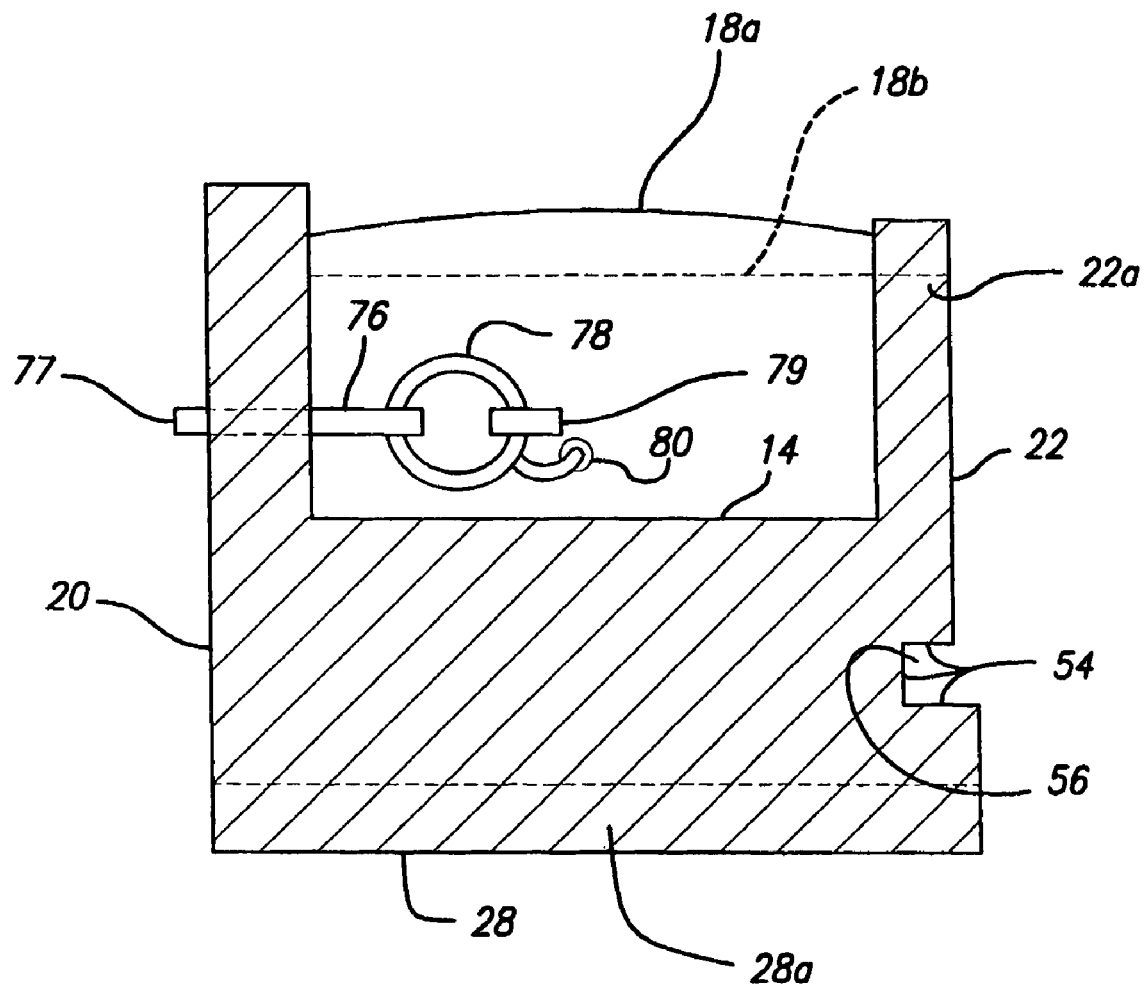
FIG. 3A is a partial sectional view along the line 3A-3A of FIG. 1.

FIG. 3A is a partial sectional view along the line 3A-3A of FIG. 1 of the embodiment 10 of the pet seat showing the seat member 14, back member 20 and front member 22 unitarily molded along with the first side member 18 (not shown in FIG. 3A) and second side member 18. As shown on FIG. 3A, the top 18a of second side 18 (and the top 16a of first side 16) may be parallel to the lower face surface 28 or may, as shown by dotted line 18b be at an angle thereto.

As shown in FIGS. 1 and 3A the top 22a of front member 22 may be arcuate extending downwardly toward the seat member 14 to provide a better forward view for a pet in the pet receiving cavity 50.

Figure 3B:
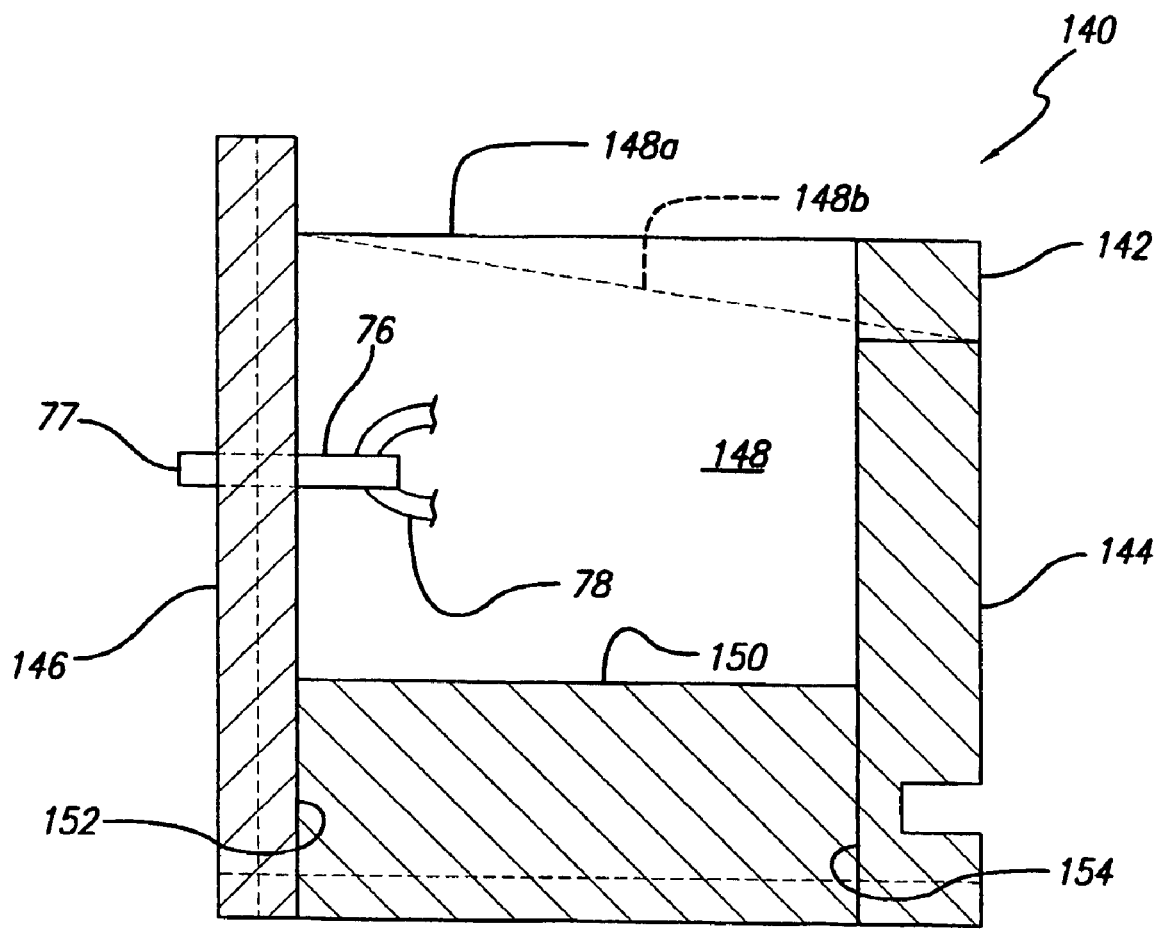
FIG. 3B is a partial sectional view similar to FIG. 3A of another embodiment of the invention set forth in my above mentioned co-pending patent application Ser. No. 11/154,30.

FIG. 3B is a partial sectional view similar to FIG. 3A of an embodiment 140 of a pet seat 142 in which the front member 144, back member 146, first side member (not shown in FIG. 3B) an second side member 148 are unitarily molded and the seat member 150 is cut from a sheet of appropriate material and bonded for example by adhesive bonding as indicated at 152 and 154 to the front member 144 and back member 146.

In the embodiments of the invention set forth in my above mentioned co-pending patent application Ser. No. 11/154,302 invention, the first side face surface and the second side face surface lie in spaced apart, parallel planes and the front face surface and the back face surface lie spaced apart, parallel planes and the front member and back member are substantially at right angles to the first and second sides Other angular relationships between the members of the pet seat of the present invention may be selected as desired for particular applications.

Figure 4:
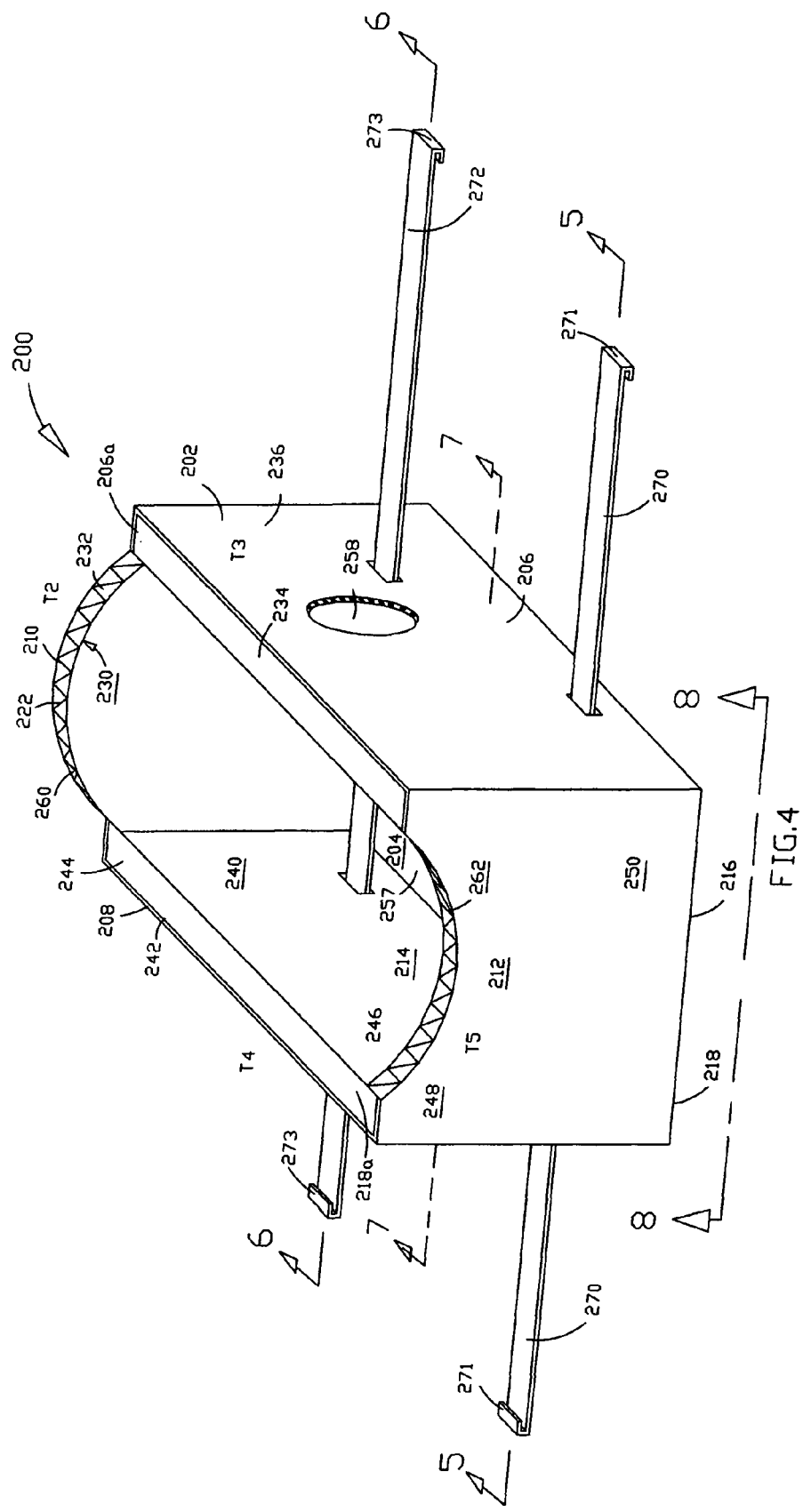
FIG. 4 illustrates a perspective view of a preferred embodiment of a pet seat of the present invention.

According to the principles of the present invention, a pet seat may be provided which may be securely restrained on the console structure of a vehicle provided therewith. Referring now to FIG. 4 there is illustrated an embodiment, generally designated 200, of a preferred embodiment of the present invention. The embodiment 200 has a body 202 which may be fabricated from the same materials as the body 12 described above such as a flexible, resiliently deformable material such as a closed cell polyester and/or polyether based urethane polymer foam plastic, though depending upon the application, an open cell foam may be utilized for the body member 12. Similarly, foam materials other than polyester and/or polyether based urethane polymer may utilized for the body member 12 and materials other than a foamed plastic, such as, for example, conventional upholstery stuffing or the like may be utilized for the body 202 depending on the particular application.

In the above mentioned preferred embodiment 200, the polyurethane foam plastic may have density in the range of 0.5 to 15.0 pounds per cubic foot, a ball rebound in the range of 20% to 30% and a 25% IFD in the range of 60 to 70 although densities less than 0.5 or greater than 1.5 pounds per cubic foot and a ball rebound of less than 20% or greater than 30% and a 25% IFD less than 60 or greater than 70 may be selected depending upon the particular application of the present invention.

The body 202 is comprised of a seat member 204, a first side member 206, a second side member 208, a back member 210 and a front member 212. The seat member 204 has an upper surface 214, a lower surface 216 with a first preselected thickness T1 (FIG. 6) therebetween. The lower surface 216 of the seat member 204 of the body 202 defines a bottom face surface 218. The back member 210 has an inner surface 230, an outer surface 232 and a second preselected thickness T2 therebetween. The outer surface 232 of the back member 210 of body 202 defines a rear face surface 222 and the back member 210 is upstanding from the seat member 204. In preferred embodiments of the present invention, the back member 210 is generally in a plane at substantially a right angle to the seat member 204, though angles other than a right angle may be utilized in particular desired applications.

The first side member 206 has an inner surface 234 and an outer surface 236 with a third preselected thickness T3 therebetween. The outer surface 236 of first side member 206 defines a first side face surface 238 and the first side member 206 of body 202 is upstanding from the seat member 204 in a plane that is substantially at a right angle to the seat member 204, though angles other than a right angle may be utilized in particular desired applications.

The second side member 208 is spaced from the first side member 206 and has an inner surface 240 and an outer surface 242 with a fourth preselected thickness T4 therebetween. The outer surface 242 of second side member 208 defines a second side face surface 244 and the second side member 208 of body 202 is upstanding in a plane from the seat member 204 at substantially a right angle, though angles other than a right angle may be utilized in particular desired applications.

The front member 212 is spaced from the back member 210 and has an inner surface 246 and an outer surface 248 with a fifth preselected thickness T5 (FIG. 7) therebetween and the front member 212 is upstanding from the seat member 14 at substantially a right angle though angles other than a right angle may be utilized in particular desired applications. The outer surface 248 of front member 212 defines a front face surface 250. The inner surface 230 of back member 210, the inner surface 234 of first side member 206, the inner surface 240 of second side member 208, the inner surface 246 of front member 212 and the upper surface 214 of seat member 204 define a pet accepting cavity 252 therebetween.

The back member 210 has an upper portion 260 which, in preferred embodiments of the present invention is spaced above the top portion 206a of first side member 206 and top 208a of second side member 208. The front member 212 has an upper portion 262 which is concave downwardly toward the seat member 204 to provide a greater forward visibility for a pet within the pet cavity 252.

In preferred embodiments of the present invention the seat member 204, first side member 206, second side member 208, back member 210 and front member 212 are unitarily fabricated, for example by molding. In other preferred embodiments, one or more of the seat member 204, first side member 206, second side member 208, back member 210 and front member 212 may be separately fabricated for example by cutting from a sheet of appropriate material from the remainder of the members and all the members joined together as may be required by an adhesive bonding, though other bonding methods as know in the art may be utilized. For example, the first side member 206 and/or the second side member 20 may be separately fabricated for example by cutting from a sheet of appropriate material and the seat member 204, back member 210 and front member 212 may be unitarily fabricated for example by molding and the first side member 206 and/or second side member 208 joined thereto by adhesive bonding. In another preferred embodiment of the present invention the seat member 204 may be separately fabricated for example by cutting from a sheet of appropriate material and the first side member 206, second side member 208, front member 212 and back member 210 may be unitarily fabricated for example by molding and then joined to the seat member 204 by adhesive bonding or other suitable joining material. Other arraignments of unitarily molded parts and separately molded or cut parts may be utilized as desired for particular applications.

If desired, the materials utilized for the various parts of the body 202 may be varied as may the characteristics thereof. For example the seat member 204 may be fabricated from a less dense foam plastic than the side member 206 and 208 and/or the back member 210 and/or the front member 212.

Variations in the thickness selected for each member of body 12 may be chosen as may be desired for particular applications. The thicknesses of T1, T2, T3, T4 and T5 may be varied as desired or may be the same depending upon the application of the embodiment 200.

In preferred embodiments of the present invention the seat member 204, first side member 206, second side member 208, back member 210 and front member 212 are unitarily fabricated, for example by molding. In other preferred embodiments, one or more of the seat member 204, first side member 206, second side member 208, back member 210 and front member 212 may be separately fabricated for example by cutting from a sheet of appropriate material from the remainder of the members and all the members joined together as may be required by an adhesive bonding, though other bonding methods as know in the art may be utilized. For example, the first side member 206 and/or the second side member 208 may be separately fabricated for example by cutting from a sheet of appropriate material and the seat member 204, back member 210 and front member 212 may be unitarily fabricated for example by molding and the first side member 206 and/or second side member 208 joined thereto by adhesive bonding. In another preferred embodiment of the present invention the seat member 204 may be separately fabricated for example by cutting from a sheet of appropriate material and the first side member 206, second side member 208, front member 212 and back member 210 may be unitarily fabricated for example by molding and then joined to the seat member 204 by adhesive bonding or other suitable joining materials. Other arraignments of unitarily molded parts and separately molded or cut parts may be utilized as desired for particular applications.

If desired, the materials utilized for the various parts of the body 12 may be varied as may the characteristics thereof. For example the seat member 204 may be fabricated from a less dense foam plastic than the side member 206 and 208 and/or the back member 210 and/or the front member 212.

Figure 8:
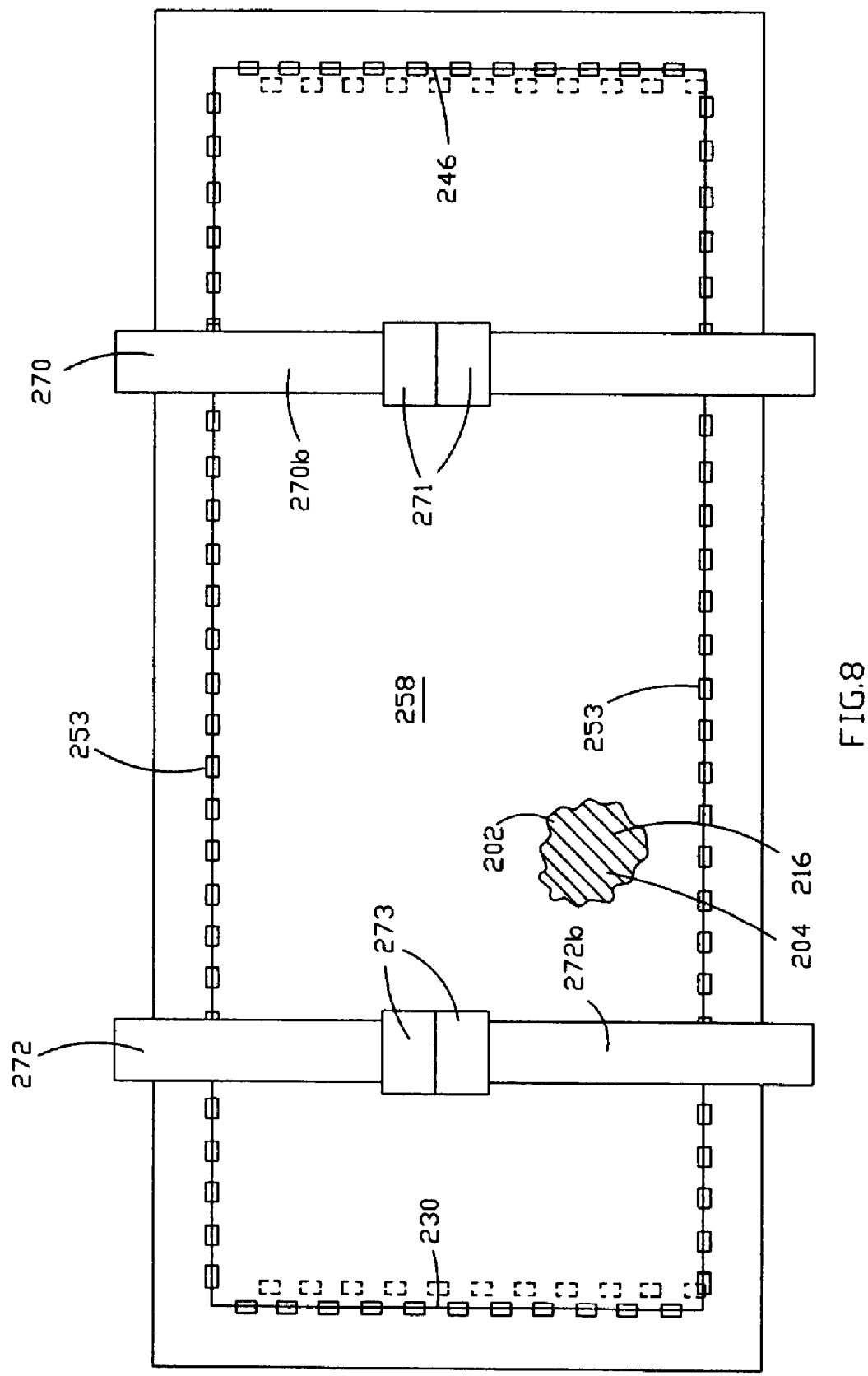
FIG. 8 is a perspective view of one embodiment of the invention.

A flexible cover as shown in fragmentary form on FIG. 1 at 258 is provided in the embodiment 200 for removably covering the body 202. One or more zippers 253, (shown on FIG. 8)

may be utilized for removably securing the cover 258 as may one or more hook and loop seams or the like. The cover 258 may be fabricated from cotton, nylon, velvet, canvass or any desired material suitable for the purpose. Preferably the cover 258 is tight fitting over the body member 202. If the cover 258 becomes soiled, it may be removed from the body 202 for appropriate cleaning. In the event a liquid seeps through the cover 258 onto the body 202, it is preferred, as noted above, that the body 202 be a closed cell foam plastic so that such liquid may be conveniently removed.

The embodiment 200 is provided with a first or forward strap member 270 and a second or back strap member 272. The forward strap member 270 is provided with detachably connectable buckles or clasps as indicated at 271. The back strap member 272 is also provided with detachably connectable buckles or clasps as indicated at 273.

As shown more clearly on FIGS. 5 and 6, the seat member 204 is provided with first walls 280 defining a first strap accepting channel 282 extending through the seat member 204 in regions adjacent the front wall 212 and intermediate the upper surface 214 and lower surface 216 of the seat member 204. The first strap 270 extends through the channel 282 from regions external the body 202 and has a first portion 270a in the channel 282 and a second portion 270b external the channel 282. The clasps or buckles 271 on the extremities of the strap 270 are adapted to be joined together external the body 202 as shown on FIG. 8 adjacent the lower surface 216 of seat member 202 and for the condition of the clasps or buckles 271 joined together the first strap 270 is in the form of a loop.

As shown on FIG. 6, the first side member 206 is provided with second walls 284 defining a first strap accepting aperture 286 extending therethrough and the second side member 208 is provided with third walls 288 defining a second strap accepting aperture 290 extending therethrough. The first strap accepting aperture 286 is aligned with the second strap accepting aperture 290. The second strap 272 extends through the first strap accepting aperture 286 and through the second strap accepting aperture 290. The second strap has a first portion 272a in the pet receiving cavity 252 and spaced the distance T6 from the upper surface 214 of the seat member 202. The second strap member 272 also has a second portion 272b external the body 202. The clasps or buckles 273 on the extremities of the strap 272 are adapted to be joined together external the body 202 as shown on FIG. 8 adjacent the lower surface 216 of seat member 202 and for the condition of the clasps or buckles 273 joined together the second strap 270 is in the form of a loop.

FIG. 7 is a sectional view along the line 7-7 of FIG. 1 and illustrates the configuration of the embodiment 200. As shown on FIG. 7, the inner surface 234 of first side member 206 is planer, the inner surface 240 of second side member 208 is planer, and the upper surface 214 of seat member 202 is planer. Similarly, as shown on FIG. 8 in dotted lines, the inner surface 230 of back member 210 is planer and the inner surface 246 of front member 212 is planer in the embodiment 200.

Figure 9:
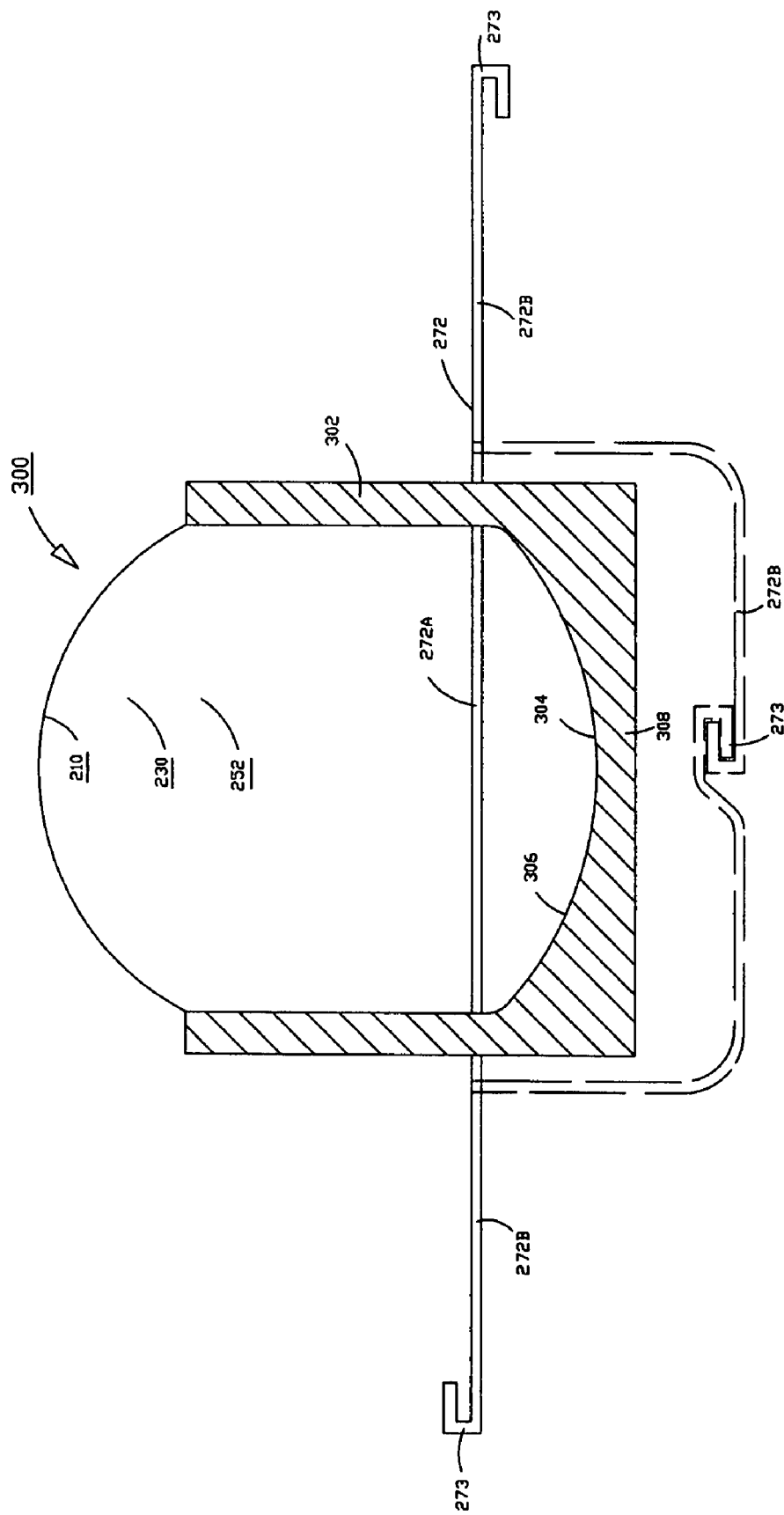
FIG. 9 is sectional view of another preferred embodiment of the present invention; and, FIG. 10 is sectional view of another preferred embodiment of the present invention.

As set forth above, in other embodiments of the present invention the configuration of the body member may be modified as desired for particular applications. FIG. 9 illustrates an embodiment 300 of the present invention and is a sectional view similar to the sectional view shown in FIG. 7. In the embodiment 300 there is provided a body 302 similar to the body 202 of embodiment 200 and has a first seat member 304 having an upper surface 306 and a lower surface 308. The upper surface 306 of body 302 is concave in the direction of the pet accepting cavity 252'.

Figure 10:
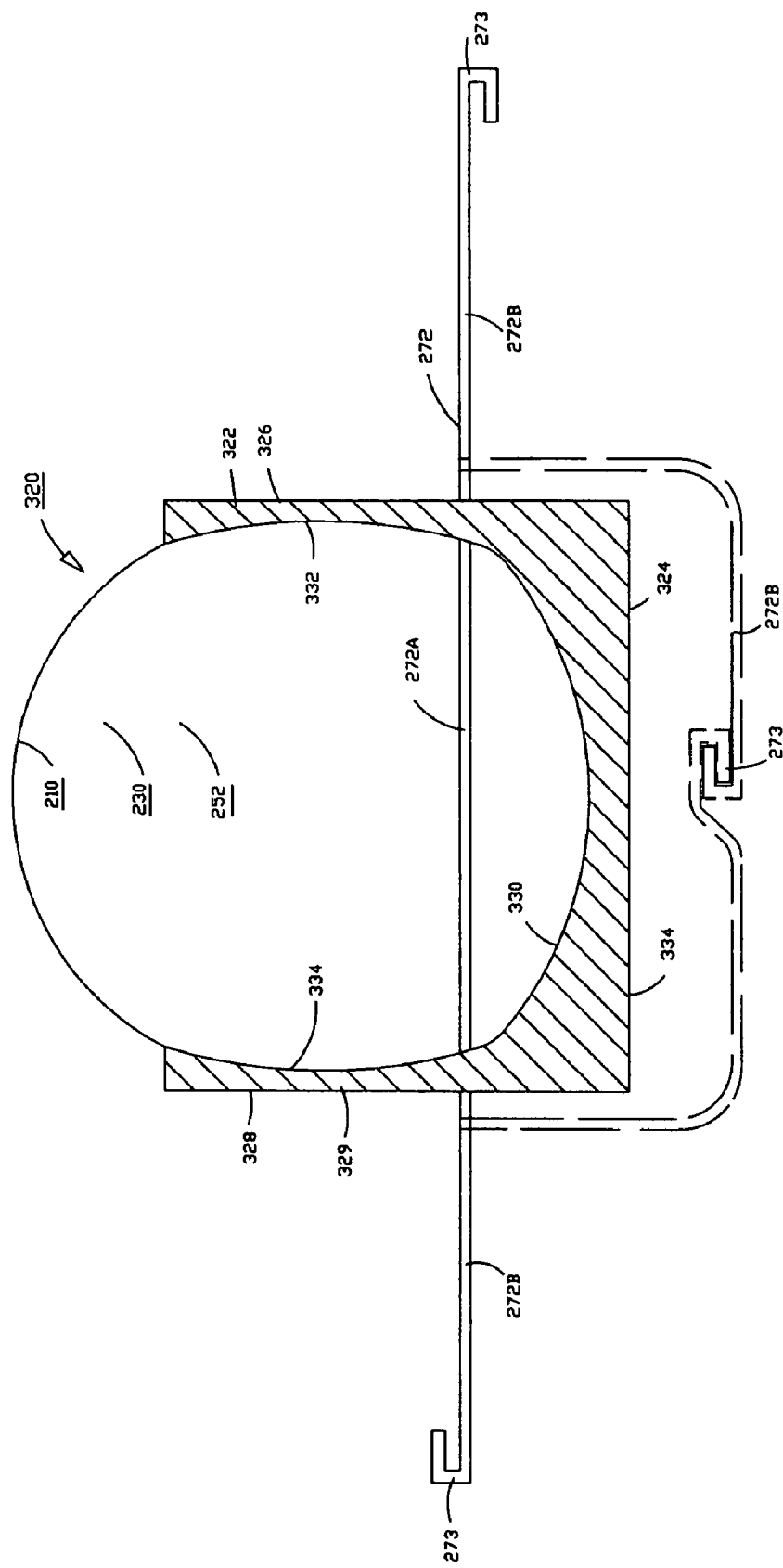

Other of the inner surfaces defining the pat receiving cavity of the present invention may also be concave. FIG. 10 illustrates an embodiment 320 of the present invention and is a sectional view similar to the sectional views shown in FIG. 7 and FIG. 9. The embodiment 320 has a body 322 and the body 322 may be similar to the body 202 of embodiment 200 and the embodiment 300 described above. The body 320 is provided with first side member 322 having an outer surface 326 and an inner surface 332. The body 322 is also provided with a second side surface 328 having an inner surface 334 and an outer 329. A seat member 324 is provided and the seat member 324 is similar to the seat member 304 of FIG. 9 and has a concave inner surface 330 concave in the direction of the pet receiving cavity 252". In the embodiment 320, the inner surface 332 of first side member 322 is concave in the direction of the pet receiving cavity 252". If desired, the inner surface 334 of second side member 328 may also be concave in the direction of the pet receiving cavity 252. The inner surface 230" of the back member 210" may also be concave in the direction of the pet receiving cavity 252" as may the inner surface of a front member (not shown).

In utilization of the pet seat according to the principles of the present invention, the first strap and the second strap are formed into the loop configuration as illustrated in FIGS. 7, 9 and 10 for the second strap 272. The buckle or clasp 273 and 271 are connected and the lid of a vehicle console (not shown) is placed between the bottom surface of the seat member such as 216, 308 and 334 and the strap portions 270b and 272b. The console seat is then closed to secure the pet seat firmly in place. The pet may then be placed into the pet receiving cavity 252 and the collar worn by the pet may be connected to the second strap 272 in the portion 272a.

From the above it can be seen that there has been provided an improved pet seat for carrying a pet in which the pet seat is securely attached to the console of a vehicle and in which the pet is secured in the pet seat.

While particular embodiments and applications of the present invention have been above described an illustrated, the present invention is not limited to the precise construction and arrangements disclosed. Those persons knowledgeable in the art may conceive of certain modifications, changes and variations in the detailed embodiments disclosed above as illustrative, to suit particular circumstances or products to be formed. The invention is therefore not intended to be limited to the preferred embodiments depicted, but only by the scope of the appended claims and the reasonably equivalent apparatus and methods to those defined therein.

As set forth above, the pet seat of the present invention is particularly adaptable for the use with comparatively small pets, such as those with a weight on the order of four pounds. For such small pets, as shown on FIG. 1 the pet seat of the present invention may have a width W on the order of nine inches, a length L on the order of fifteen inches and a height H on the order of eight inches. These dimensions may vary as may the thickness of each member of the body as long as the pet seat is compatible with the installation of the pet seat on the console of a vehicle

What is claimed is:

1. A portable pet seat arrangement comprising, in combination:
    a flexible, resilient body having:
        a seat member having an upper surface and a lower surface and a first preselected distance therebetween and said lower surface defining a bottom face surface;
        a back member having an inner surface and an outer surface and a second preselected thickness therebetween, and said outer surface of said back member defining a rear face surface, said back member upstanding from said seat member;

a first side member having an inner surface and an outer surface and a third preselected distance therebetween, a top surface, and said outer surface of said first side member defining a first side face surface, and said first side member upstanding from said seat portion;

a second side member having an inner surface and an outer surface and a fourth preselected distance therebetween and a top surface, and spaced from said first side member said outer surface of said second side member defining a second side face surface, and said second side member upstanding from said seat portion;

a front member having an inner surface and an outer surface and a fifth preselected distance therebetween and spaced from said back member, and said front member upstanding from said seat member, said inner surfaces of said seat member, said back member and said first side member and said second side member defining a pet accepting cavity therebetween; and said outer surface of said front member defining a front face surface, said seat member having first walls defining a strap accepting channel extending therethrough intermediate said upper surface and said lower surface thereof in regions adjacent said front member;

said first side member having second walls defining a first strap accepting aperture therethrough in regions adjacent said back member and said second side member having third walls defining a second strap accepting aperture therethrough, and said first strap accepting aperture aligned with said second strap accepting aperture;

said back member comprising a third strap accepting aperture therethrough;

a first strap having a first portion in said strap accepting channel in said seat member and a second portion external said body in regions adjacent said bottom face surface of said seat member;

a second strap having a first portion extending through said first and second strap accepting apertures and in said pet accepting cavity, and a second portion in regions adjacent said bottom face surface of said seat member; and a third strap having a first portion extending through said third strap accepting aperture, and a second portion in said pet accepting cavity.

2. The arrangement defined in claim 1 wherein:
each of said first and second straps are detachably mounted on said body, and further comprising:
a flexible cover member removably mounted on said body.

3. The arrangement defined in claim 1 wherein:
said upper surface of said seat member is concave.

4. The arrangement defined in claim 1 wherein:
said inner surface of at least one of said first side member and said second side member are concave.

5. The arrangement defined in claim 1 wherein:
said upper surface of said seat member is concave; and,
at least one of said inner surface of said first side member and said inner surface of said second side member is concave.

6. The arrangement defined in claim 5 and wherein:
each of said first and second straps are detachably mounted on said body, and further comprising:
a flexible cover member removably mounted on said body.

7. The arrangement defined in claim 6 wherein:
said first preselected thickness is greater than said second, said third and said fourth preselected distances; and, said second preselected distance is greater than said third preselected distance and greater than said fourth preselected distance.

8. The arrangement defined in claim 7 wherein:
said third preselected distance is substantially the same as said fourth preselected distance.

9. The arrangement defined in claim 1 wherein:
said first preselected thickness is greater than said second, said third and said fourth preselected distances; and, said second preselected distance is greater than said third preselected distance and greater than said fourth preselected distance.

10. The arrangement defined in claim 1 wherein:
said first preselected thickness is substantially the same as said second, said third and said fourth preselected distances.

11. The arrangement defined in claim 10 wherein:
said back member has an arcuate upper portion and said arcuate upper portion of said back member extending a fifth preselected distance above said upper surface of said seat member and above a top portion of said side members.

12. The arrangement defined in claim 11 wherein:
said front member has an arcuate upper portion and said arcuate upper portion of said front member extends a sixth preselected distance above said upper surface of said seat member and below said top portion of said side members.

13. The arrangement defined in claim 12 wherein:
each of said first and second straps are detachably mounted on said body, and further comprising:
a flexible cover member removably mounted on said body.

14. The arrangement defined in claim 1 wherein:
said front member, said back member, said first side member and said second side member extend upwardly at substantially right angles from said seat member.

15. The arrangement defined in claim 14 and further comprising:
at least one of said inner surfaces of said seat member, said first side member, said second side member, said back member and said front member are concave.

16. The arrangement defined in claim 15 wherein:
said inner surface of said seat member, said inner surface of said first side member and said inner surface of said second side member are concave.

17. The arrangement defined in claim 16 wherein:
said seat member, said first side member, said second side member said back member and said front member are unitarily molded from a polyurethane foam having a density in the range of 0.5 to 1.5 pounds per cubic foot, a ball rebound in the range of 20% to 30% and an IFD in the range of 60 to 70.

18. The arrangement defined in claim 1, wherein said third strap further comprises a latch.

19. The arrangement defined in claim 1, wherein said third strap is a tether suitable for restraining a pet.

20. The arrangement defined in claim 1, wherein said first strap and said second strap are adapted for securing said pet seat to a vehicle console.

21. A pet seat comprising:
a body comprising:
a seat member having an upper surface and a lower surface and said lower surface defining a bottom face surface;

a back member upstanding from said seat member;

a first side member upstanding from said seat portion;

a second side member spaced from said first side member, and said second side member upstanding from said seat portion; and a front member upstanding from said seat member, and with an outer surface defining a front face surface, said front face surface having first walls defining a restraining strap accepting groove therein in regions spaced from said bottom face surface of said seat member.

22. The pet seat in claim 21, further comprising a restraining strap member extending through said back member in regions spaced from said seat member and into a pet receiving cavity.

23. The pet seat in claim 21 wherein said first side face surface has second walls defining a first longitudinal groove at said lower surface of said seat member and extending from said front face surface to said rear face surface, and wherein said second side face surface has third walls defining a second longitudinal groove at said lower surface of said seat member and extending from said front face surface to said rear face surface.

24. The pet seat in claim 23 wherein said first longitudinal groove is substantially parallel to said second longitudinal groove.

25. The pet seat in claim 21 wherein the thickness of the seat member is greater than the thickness of the back member, first side member, or second side member; and the thickness of the back member is greater than the thickness of the first side member or second side member.

26. The pet seat in claim 25 wherein the thickness of the first side member is substantially the same as the thickness of the second side member.

27. The pet seat in claim 21 wherein said front member, said back member, said first side member and said second side member extend upwardly at substantially right angles from said seat member.

28. The pet seat in claim 21 and further comprising:
a flexible cover removably mounted on at least a portion of said body; and
a strap coupled to said flexible cover at said upper portion of said back member in regions adjacent the other of said first side member and said second side member.

29. The pet seat in claim 21 wherein said seat member, said first side member, said second side member said back member and said front member are unitarily molded from a polyurethane foam having a density in the range of 0.5 to 1.5 pounds per cubic foot, a ball rebound in the range of 20% to 30% and an IFD in the range of 60 to 70.

30. The pet seat in claim 21 wherein at least one of said front member, said first side member, said second side member and said back member are separately fabricated and adhesively coupled to said seat member.

31. The pet seat in claim 21 wherein said back member has an upper portion and said upper portion of said back member extends away from said seat member and above a top portion of said side members.

* * * * *

UNITED STATES PATENT AND TRADEMARK OFFICE
CERTIFICATE OF CORRECTION

| | | |
|---|---|---|
| PATENT NO. | : 7,717,062 B2 | |
| APPLICATION NO. | : 11/480720 | |
| DATED | : May 18, 2010 | |
| INVENTOR(S) | : Nancy Kline | |

It is certified that error appears in the above-identified patent and that said Letters Patent is hereby corrected as shown below:

Column 2, line 52, Please delete "body m", and insert -- body --.

Column 8, line 18, Please delete "112.", and insert -- 112 --.

Column 8, line 48, Please delete "lie spaced apart", and insert -- lie in spaced apart --.

Column 8, line 50, Please delete "sides", and insert -- sides. --.

Column 10, line 7, Please delete "member 20", and insert -- member 208 --.

Column 12, line 1, Please delete "pat", and insert -- pet --.

Signed and Sealed this
Fifteenth Day of March, 2011

David J. Kappos
*Director of the United States Patent and Trademark Office*